(12) United States Patent
Li et al.

(10) Patent No.: US 12,277,500 B2
(45) Date of Patent: Apr. 15, 2025

(54) NEURAL NETWORK OPTIMIZATION METHOD, ELECTRONIC DEVICE AND PROCESSOR

(71) Applicant: Xiamen SigmaStar Technology Ltd., Fujian (CN)

(72) Inventors: Yudong Li, Fujian (CN); Xiaolong Liu, Fujian (CN)

(73) Assignee: SIGMASTAR TECHNOLOGY LTD., Fujian (CN)

( * ) Notice: Subject to any disclaimer, the term of this patent is extended or adjusted under 35 U.S.C. 154(b) by 1002 days.

(21) Appl. No.: 17/324,536

(22) Filed: May 19, 2021

(65) Prior Publication Data

US 2022/0076123 A1 Mar. 10, 2022

(30) Foreign Application Priority Data

Sep. 4, 2020 (CN) .......................... 202010924255.2

(51) Int. Cl.
*G06N 3/08* (2023.01)
*G06F 11/07* (2006.01)
*G06N 3/082* (2023.01)

(52) U.S. Cl.
CPC ......... *G06N 3/082* (2013.01); *G06F 11/0751* (2013.01); *G06F 11/0793* (2013.01)

(58) Field of Classification Search
CPC .......... G06N 3/082; G06N 3/04; G06N 3/044; G06N 3/045; G06F 11/0751; G06F 11/0793; G06F 18/2415; G06V 10/267
See application file for complete search history.

(56) References Cited

U.S. PATENT DOCUMENTS

| | | | | |
|---|---|---|---|---|
| 2016/0358070 | A1* | 12/2016 | Brothers | G06N 3/082 |
| 2019/0303762 | A1* | 10/2019 | Sui | G06N 3/04 |
| 2021/0158131 | A1* | 5/2021 | Jain | G06N 3/105 |
| 2022/0051104 | A1* | 2/2022 | Interlandi | G06N 3/045 |

OTHER PUBLICATIONS

Deng, "Model Compression and Hardware Acceleration for Neural Networks: a Comprehensive Survey", IEEE, Date of publication Mar. 20, 2020. (Year: 2020).*

* cited by examiner

*Primary Examiner* — Dave Misir
(74) *Attorney, Agent, or Firm* — Edell, Shapiro & Finnan, LLC

(57) ABSTRACT

The present invention discloses a neural network optimization method. An operator to be replaced is selected from multiple operators in a network layer according to a predetermined condition, and the operator to be replaced is replaced by multiple equivalent operators according to a calculation function corresponding to the operator to be replaced, wherein the multiple equivalent operators include a target operator. Pre-calculating is performed for a first operator among the multiple equivalent operators, and the calculation result is inputted into the target operator. A second operator is identified according to data change conditions of the multiple equivalent operators, and the second operator is combined with the target operator to complete optimization of a neural network model. The present invention can further perform lossless conversion of the operators in the neural network, further improving calculation performance on the basis of a simplified network structure.

11 Claims, 7 Drawing Sheets

NEURAL NETWORK OPTIMIZATION METHOD, ELECTRONIC DEVICE AND PROCESSOR

This application claims the benefit of China application Serial No. CN 202010924255.2, filed on Sep. 4, 2020, the subject matter of which is incorporated herein by reference.

BACKGROUND OF THE INVENTION

Field of the Invention

The invention relates to the field of data processing, and more particularly to a neural network optimization method, a device and a processor.

Description of the Related Art

Deep neural networks have currently gained immense success in the field of computers, for example, in aspects of image classification, target detection and image segmentation. However, an efficient deep neural network frequently contains model parameters in large quantities and thus involves a great amount of computation, and the models also occupy a large space in the actual deployment, which renders failures of application in certain application scenarios that need real-time operation. Therefore, how to perform compression and acceleration of a deep neural network becomes essentially critical. Currently, compression and acceleration of a deep neural network are primarily implemented by means of network pruning.

In a conventional pruning method, pruning is decided by professional experience, for example, assuming that it is considered by human experience that a network close to an input layer in a model is more important than a network close to an output layer, and so during pruning, the pruning ratio of the network close to the input layer is determined to be less than that of the network layer close to the output layer. Rules for defining and measuring the importance of weightings included, for example, using absolute values of weightings as the basis for sorting the importance. Such pruning method greatly relies on professional experience. Moreover, a large amount of statistical calculation is needed and the conversion speed is slow during the pruning process, a result of a pruned neural network still differs from a result of the original network, and the improvement in compression and operation speed of the neural network is contributed by having pruned some of the operators (neurons) in a way that the operation amount of the neural network is reduced. As a result, the data calculation performance of the pruned neural network is also degraded.

SUMMARY OF THE INVENTION

The present invention provides a neural network optimization method, an electronic device and a processor, which can perform lossless conversion on operators in a neural network, further improving calculation performance on the basis of a simplified network structure.

A neural network optimization method provided by the present invention includes: selecting an operator to be replaced from a plurality of operators in a network layer according to a predetermined condition; replacing the operator to be replaced by a plurality of equivalent operators according to a calculation function corresponding to the operator to be replaced, wherein the plurality of operators include a target operator; pre-calculating for a first operator among the plurality of equivalent operators, and inputting a calculation result into the target operator; and identifying a second operator according to data change conditions of the plurality of equivalent operators, and combining the second operator with the target operator.

An electronic device provided by the present invention includes a neural network calculation device, which operates a neural network having been optimized by the foregoing neural network optimization method.

A processor provided by the present invention is for executing a program code to implement a neural network optimization method. The neural network optimization method includes: selecting an operator to be replaced from a plurality of operators in a network layer according to a predetermined condition; replacing the operator to be replaced by a plurality of equivalent operators according to a calculation function corresponding to the operator to be replaced, wherein the plurality of operators include a target operator; pre-calculating for a first operator among the plurality of equivalent operators, and inputting a calculation result into the target operator; and identifying a second operator according to data change conditions of the plurality of equivalent operators, and combining the second operator with the target operator.

The optimization method provided by the present invention can perform lossless conversion on operators in a neural network, further improving calculation performance on the basis of a simplified network structure.

BRIEF DESCRIPTION OF THE DRAWINGS

To better describe the technical solution of the embodiments of the present application, drawings involved in the description of the embodiments are introduced below. It is apparent that, the drawings in the description below represent merely some embodiments of the present application, and other drawings apart from these drawings may also be obtained by a person skilled in the art without involving inventive skills.

DETAILED DESCRIPTION OF THE INVENTION

Figure 1:
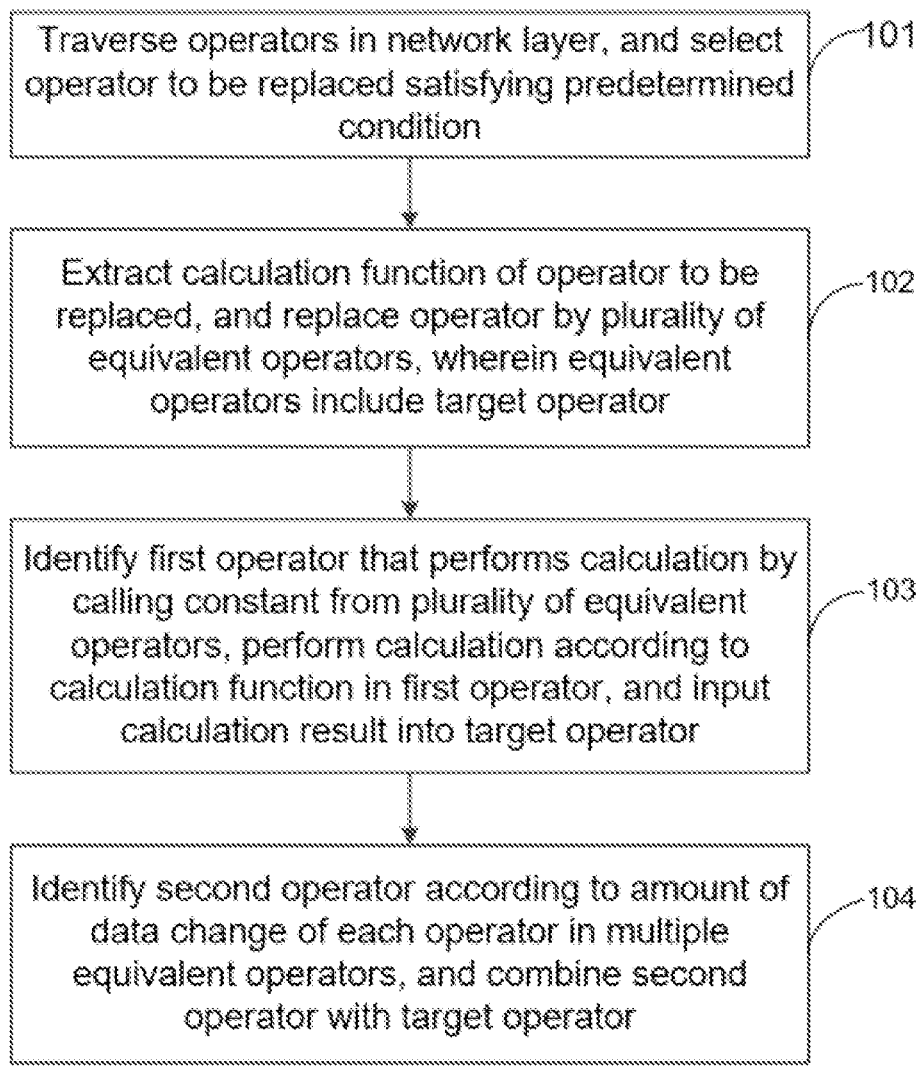
FIG. 1 is a first flowchart of a neural network optimization method provided according to an embodiment of the present invention.

The technical solutions of the embodiments of the present application are described clearly and completely with the accompanying drawings of the embodiments of the present invention below. It is apparent that, the drawings in the description below represent merely some but not all embodiments of the present application. On the basis of the embodiments of the present invention, all other embodiments obtained by a person skilled in the art without involving inventive skills are to be encompassed within the scope of protection of the present invention.

The term "embodiment" in the literature means that a combination of specific features, structures or properties described in the embodiments can be included in at least one embodiment of the present invention. This term appearing in various locations in the description does not necessarily refer to the same embodiment, or an independent or alternative embodiment mutually exclusive to other embodiments. A person skilled in the art can explicitly and implicitly understand that the embodiments given in the literature can be combined with other embodiments.

Before the technical solutions of the present invention are described, related technical terms are first explained as follows.

Deep learning framework: a deep learning framework refers to a framework for deep learning, and commonly uses computational graphs as a main data structure for describing a neural network model. On this basis, operators used as granularity or cross-operator granularity is used to complete mapping of kernel functions of the bottom layer of computational graphs. Meanwhile, a deep learning framework can implement a specific kernel function by means of directly using program design languages or calling bottom-layer computing libraries. A deep learning framework may include, for example but not limited to, Google Tensorflow, convolutional architecture for fast feature embedding (Caffe), MXNet and Torch.

Artificial intelligent processor: an artificial intelligent processor refers to a processor for a specific application or field. One example is a graphics processing unit (GPU), also referred to as a display core, a vision processor, a display chip, and is a dedicated processor exclusive for performing imaging computing on personal computers, workstations, gaming machines or some mobile apparatuses (e.g., tablet computers and smartphones). Another example is a neural processing unit (NPU), which is a dedicated processor for matrix multiplication in applications in the field of artificial intelligence, adopts "data-driven parallel computing" structure, and is especially adapted to process massive multimedia data of videos and images.

A neural network optimization method is provided according to an embodiment of the present invention. An execution entity of the neural network optimization method can be a neural network optimization device provided according to an embodiment of the present invention, or a server integrated with the neural network optimization device, wherein the neural network optimization device can be implemented in form hardware or software. In one embodiment, the neural network optimization method of the present invention is implemented by executing a program code by a processor.

In one embodiment, to describe from the perspective of the neural network optimization device, the neural network optimization device can be specifically integrated in a terminal device, wherein the terminal device is a terminal device having a storage unit and capable of running an application.

FIG. 1 shows a first flowchart of a neural network optimization method provided according to an embodiment of the present invention. Referring to FIG. 1, the neural network optimization method includes the following steps.

In step 101, operators in a network layer are traversed, and an operator to be replaced satisfying a predetermined condition is selected.

In an embodiment of the present invention, the foregoing neural network may be a model trained by a Tensorflow framework, a model trained by a Caffe framework, or an ONNX cross-frame model intermediate expression framework model. Taking Caffe for instance, Caffe supports multiple types of deep learning structures, face-oriented image classification and image segmentation, and further supports convolutional neural network (CNN), region-CNN for target detection, long/short-term memory (LSTM) and fully connected network designs.

Among the above, the Caffe framework supports multiple types of basic operators. For example, common neural network operators include convolutional/deconvolutional operators, pooling operators, activation operators, softmax (classifier) operators, and fully connected operators. The activation operators may include, for example but not limited to, ReLU, Sigmoid and Tanh, and other operators that can be implemented by interpolation. Functions of the Caffe framework may include: Caffe Blob functions, Caffe Layer functions and Caffe Net functions. Among the above, Blob is used for storing, exchanging and processing data of forward and reverse repeated operations and derivative information in the network; Layer is used for performing calculation, including non-linear operations such as convolution, pooling, inner product, rectified-linear and sigmoid, and may further include loss calculation such as element-level data conversion, normalization, data loading, softmax (classification) and hinge.

In practice, the neural network trained by each framework is first converted to a unified model structure, which is then optimized. For each operator, there are three implementations for a unified model structure—implementation in a x86 structure, implementation by using a x86 structure imitating an NPU, and implementation in an NPU instruction set. All operators only perform forward propagation so as to operate forward on an NPU. Each operator in the neural network trained by each framework corresponds to one or more operator combinations in a unified model structure. Optimization of a model structure described in the present invention is, after the neural network trained by each framework has been converted to the unified model structure, optimization performed on the model using the x86-structure implementation of the operator of the unified model structure.

In actual utilization, neural network models frequently operate on universal calculation platforms such as a GPU or NPU, while being quite restricted on certain other platforms such as low power consumption hardware calculation platforms compared to the universal calculation platforms above. Benefits of optimization of a neural network of the present invention further include providing operability on low power consumption hardware calculation platforms, and consistency between calculation results of operators in an optimized network and calculation results of a universal calculation platform.

Specifically, all operators in the neural network having been trained as above are traversed, wherein each of the operators has a method for implementing specific calculation, and some of the calculation methods may require the use of corresponding hardware. An operator that satisfies a predetermined condition, i.e., an operator to be replaced, is selected during the optimization process of the neural network. In one embodiment, the predetermined condition may be selecting a calculation node, i.e., an operator, unsuitable for operation on a low power consumption hardware calculation platform, such as an operator incapable of performing a corresponding function due to the lack of certain hardware on the low power hardware calculation platform. For example, assuming that the neural network above is a model trained by a Tensorflow framework and the specific operation of a FullyConnected node in Tensorflow is matrix multiplication, and yet no corresponding hardware for calculation is available on the hardware calculation platform, it can be determined that the node, i.e., the operator, satisfies the predetermined condition, and the operator is used as the operator to be replaced.

In step 102, a calculation function of the operator to be replaced is extracted, and the operator to be replaced is replaced by a plurality of equivalent operators according to the calculation function, wherein the equivalent operators include a target operator.

In one embodiment, the operator to be replaced above may be an operator unsuitable for operation on a low power consumption hardware calculation platform, and is for example, an operator for which calculation is not supported. In order to replace the operator to be replaced, an operator after replacement then needs to achieve an algorithm of the operator originally in the framework. Specifically, a calculation function of the operator to be replaced can be extracted, and the operator to be replaced is replaced by a plurality of equivalent operators according to the calculation function, wherein the equivalent operators include a target operator.

After extracting the calculation function of the operator to be replaced, it is necessary to further perform equivalent derivation at a mathematical level according to the calculation function, and then select an operator from a plurality of operators supported by the low power consumption hardware platform to replace the operator for which calculation is not supported under the original framework. Since equivalence is needed before and after the replacement, operators needed for the replacement for different operators for which calculation is not supported are also different. For example, an operator for which calculation is not supported can be replaced by two constant operator nodes and one operator node, wherein the operator node is used as a target node, i.e., the target operator. The specific replacement method is associated with the implementation of the operator for which calculation is not supported; for example, equivalent derivation can be performed according to the calculation function of the operator for which calculation is not supported, such that calculation results of the two constant operator nodes and the one operator node after the replacement are the same as the calculation result of the operator for which calculation is not supported.

For example, assume that the operator to be substituted above is FullyConnected in TensorFlow, the specific operation of a FullyConnected node is matrix multiplication. Thus, the FullyConnected node can be converted to an operator Conv2D and a plurality of pad operators, so that the calculation result of the converted operators is consistent with the result of the operator to be replaced. The operator Conv2D is the target operator. After the replacement, the operator Conv2D needs three tensors including "input", "weight" and "bias" in order to perform calculation. During the conversion, "weight" and "bias" of FullyConnected in the network need to be converted in advance to shapes identifiable to Conv2D (convolutional operator), while ensuring at the same time that the calculation result is consistent with the calculation result of FullyConnected. The step of replacing the operator to be replaced by the plurality of equivalent operators according to the calculation function includes: acquiring a weight and a bias of the operator to be replaced; calculating feature information of the target operator according to the weight and the bias of the operator to be replaced; and replacing the operator to be replaced by the plurality of equivalent operators according to the calculation function and the feature information, wherein the equivalent operators include the target operator.

In step 103, among the equivalent operators, a first operator calculated by calling a constant is identified, calculation is performed according to the calculation function in the first operator and the constant, and the calculation result is inputted into the target operator.

In one embodiment, after replacing the operator to be replaced by the equivalent operators, some operators of the equivalent operators are corresponding to operations of constants, and so pre-calculation can be performed, and the calculation result is then inputted into the target operator among the equivalent operators. Specifically, the plurality of equivalent operators above are first identified, an operator calculated by calling a constant is selected accordingly, i.e., the first operator, calculation is performed according to the calculation function in the first operator and the constant, and the calculation result is then inputted into the target operator.

Figure 2:
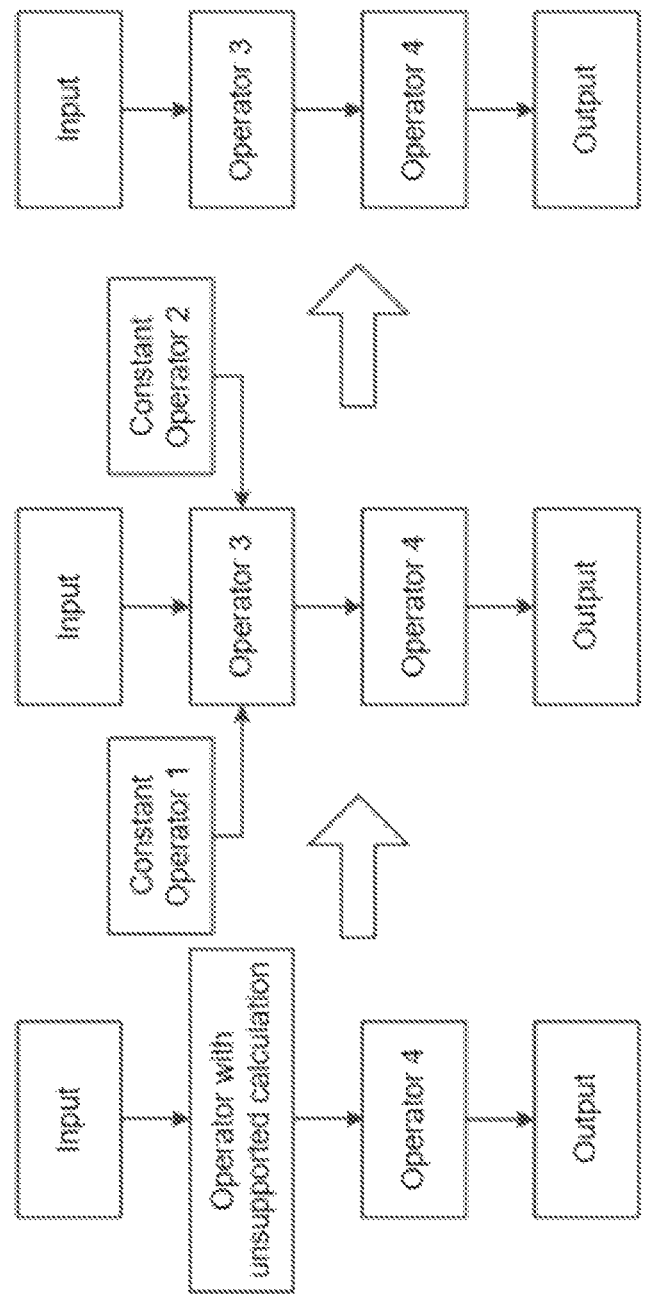
FIG. 2 is a schematic diagram of neural network conversion in the neural network optimization method in FIG. 1 according to an embodiment of the present invention.

For example, referring to FIG. 2, after the operator for which calculation is not supported is replaced by two constant operator nodes (respectively constant operator 1 and constant operator 2) and one operator 3 node, if it is detected that the operators of constant operator 1 and constant operator 2 are both corresponding to operations of constants, it can be determined that constant operator 1 and constant operator 2 are the foregoing first operator, pre-calculation is performed respectively, the calculation result is placed into the operator 3, and operation is then performed after entering data from "Input" when the network operates.

Constant operator 1 and constant operator 2 may be pre-calculated using calculation functions in respective operators. Operator 3 needs three operands for calculation—the first is "input" that needs to use input data corresponding to the neural network, and the second and third have been pre-calculated and are stored on a corresponding operand position of operator 3.

In one embodiment, each operator has a method for implementing specific calculation. During the optimization process of a neural network, every operator is traversed. When it is discovered that a constant tensor appears in the calculation of an operator, the calculation method of the operator is called, the calculation of the constant tensor is completed in advance, the calculation result is kept in a constant tensor space in the node, and the original constant operator can be deleted at the same time.

A specific example is given below. For example, assuming constant operator 1 and constant operator 2 are operators "Fill", the specific object of operator Fill is to generate data of a specified shape according to a dimension parameter in the aim of filling the operand position in operator 3. During the optimization process of the neural network, it is discovered that the calculation of operator Fill does not rely on data of an upper layer in the network, and can be completed entirely according to a predetermined parameter. Thus, calculation is completed in advance during the optimization process, and the result is directly kept in operator 3. The method is capable of calculating in advance network nodes for which equivalent conversion is complete, thus reducing unnecessary calculation in a low power consumption hardware platform for the network.

In step 104, a second operator is identified according to the amount of data change of each operator among the plurality of equivalent operators, and the second operator is combined with the target operator.

In one embodiment, some operators can be further combined, for example, after the operator node for which calculation is not supported has been converted to equivalent operator 3-1 and operator 3-2. The calculation methods of operator 3-1 and operator 3-2 satisfy a combination condition, and operator 3-1 and operator 3-2 are combined into a calculation node of operator 3 while pre-calculation of nodes is performed, hence simplifying the structure and optimizing calculation performance.

Which operators satisfy the combination conditions need to be first determined, the operator satisfying the condition is determined as the second operator, and the second operator is combined with the target operator. In one embodiment, the second operator can be identified according to the amount of data change of each operator among the plurality of equivalent operators. For example, if the operator to be replaced above is FullyConnected in Tensorflow, FullyConnected is converted to an operator Conv2D and a plurality of pad operators in step 102, and it is detected that data is not increased before and after operation of one of the pad operators, that is, the data amount before and after processing has not changed, it can then be determined that the pad operator is the second operator, and the pad operator is combined with the operator Conv2D to thereby complete optimization of the neural network.

It is known from the above that, the embodiments provided by the invention can quickly simplify the network structure, equivalently replace a calculation node of the neural network, and pre-calculate constant data in the neural network, wherein the equivalent replacement the calculation node of the neural network does not affect the calculation result of each node. Moreover, the embodiments provided by the invention can further combine some nodes, and generate a network model suitable for the use of a low power consumption hardware platform after optimizing the neural network. The conversion process is simple and fast, and the model granularity after the conversion is the same as that of the original model.

Figure 3:
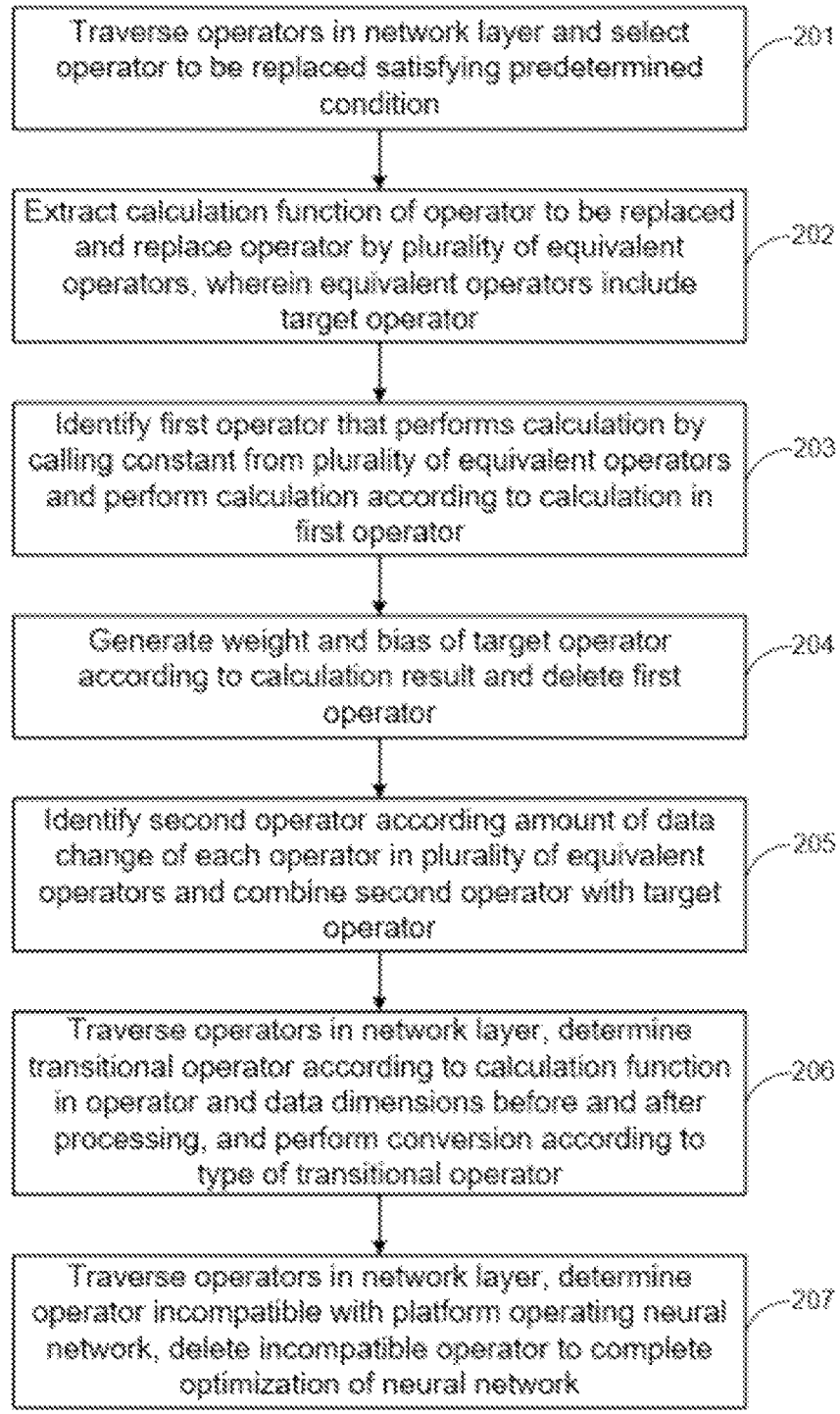
FIG. 3 is a second flowchart of a neural network optimization method provided according to another embodiment of the present invention.

FIG. 3 shows a second flowchart of a neural network optimization method provided according to another embodiment of the present invention. Referring to FIG. 2, the method may include the following steps.

In step 201, operators in a network layer are traversed, and an operator to be replaced satisfying a predetermined condition is selected. Specific implementation details of step 201 can be referred from the description of step 101 above, and are omitted herein.

In step 202, a calculation function of the operator to be replaced is extracted, and the operator to be replaced is replaced by a plurality of equivalent operators, wherein the plurality of equivalent operators include a target operator.

Figure 4:
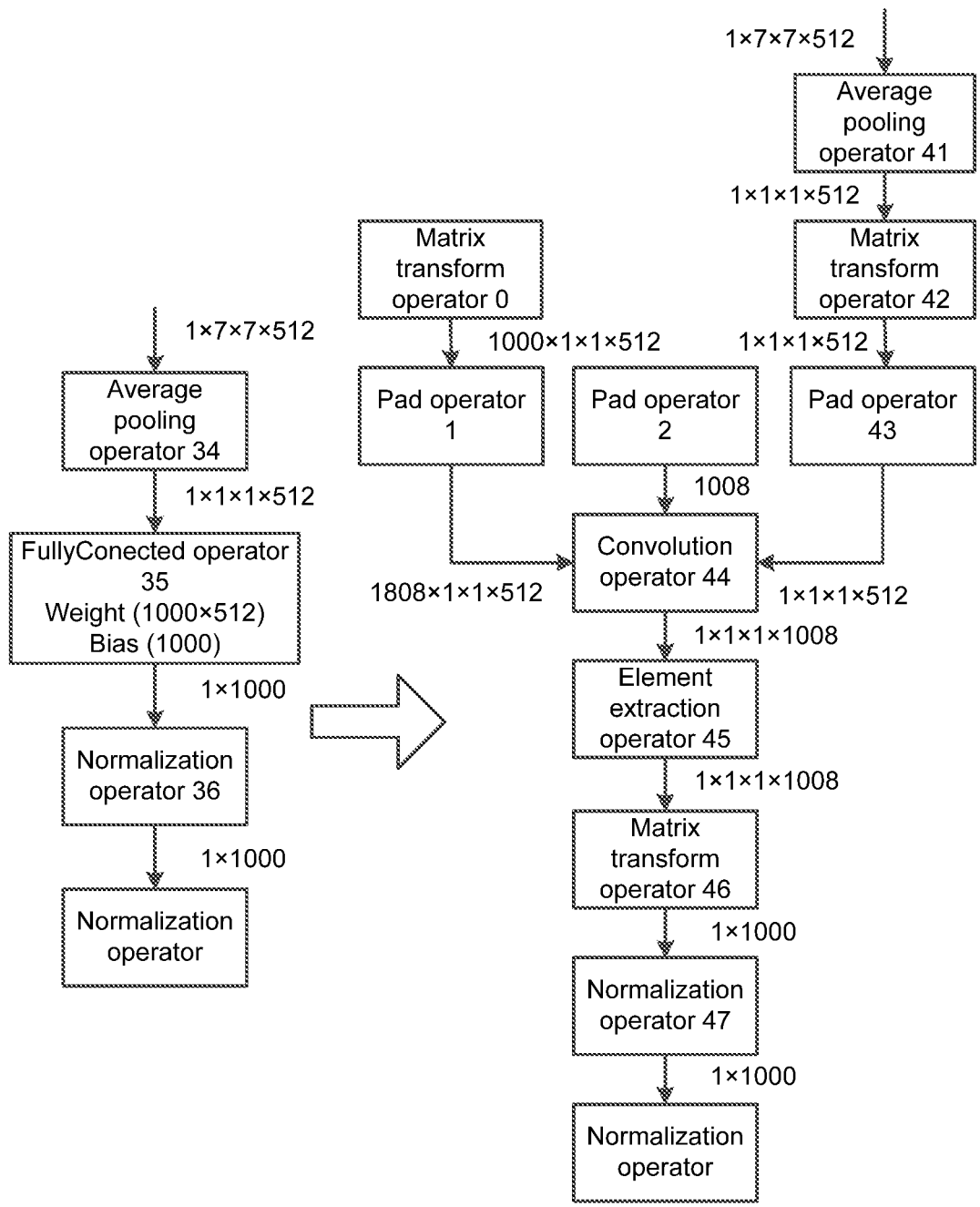
FIGS. 4 to 6 are schematic diagrams of neural network conversion in the neural network optimization method in FIG. 3 according to an embodiment of the present invention.

For example, as shown in FIG. 4, assuming the operator to be replaced above is FullyConnected (node 35) in Tensorflow, the specific operation of FullyConnected (node 35) is matrix multiplication, and can then be converted to the operator Conv2D (node 44), a plurality of operators Reshape (nodes 0 and 42), and a plurality of pad operators (nodes 1, 2 and 43), so that the calculation result in the operator after the conversion is consistent with the calculation result of the operator to be replaced. The operator Conv2D (node 44) above is the target operator.

Further, after the replacement, the operator Conv2D (node 44) needs three tensors including "input", "weight" and "bias" in order to be calculated. During the conversion, "weight" and "bias" of FullyConnected (node 35) in the network need to be converted in advance to shapes identifiable to Conv2D, while ensuring that the calculation result is consistent with the calculation result of FullyConnected (node 35).

In step 203, among the equivalent operators, a first operator calculated by calling a constant is identified, and calculation is performed according to the calculation function in the first operator and the corresponding constant.

In step 204, a weight and a bias of the target operator are generated according to the calculation result, and the first operator is deleted.

In one embodiment, each operator has a method for implementing specific calculation. During the optimization process of a neural network, when it is discovered that a constant tensor appears in the calculation of an operator, the calculation method of the operator is called, the calculation of the constant tensor is completed in advance, the calculation result is kept in a constant tensor space in the node, and the original constant operator can be deleted at the same time.

Figure 5:
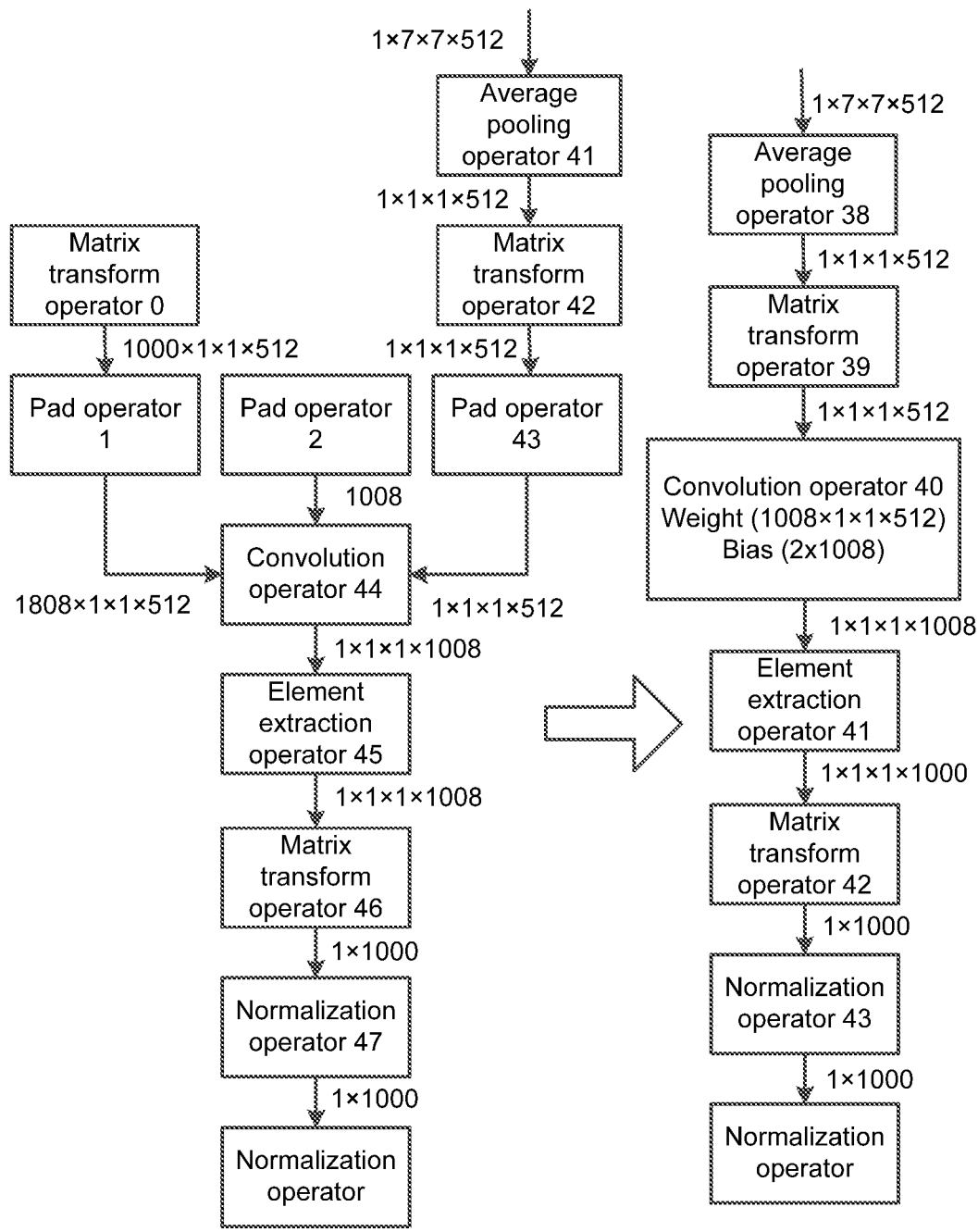

For example, referring to FIG. 5, nodes 0, 1 and 2 in the drawing are nodes for calculating constants, and the calculation thereof does not rely on data of an upper layer in the network and can be completed entirely according to a predetermined parameter. Thus, a first operator that performs calculation by calling a constant can be identified from the plurality of equivalent operators, nodes 0, 1 and 2 above are pre-calculated, and the calculation result is combined into the weight and bias of the operator Conv2D (node 44). In the step of pre-calculating, calculation can be performed specifically according to the calculation function in the first operator and the corresponding constant.

Further, after completing the pre-calculation, since the calculation result is already stored in the target node, i.e., the operator Conv2D (node 44), nodes 0, 1 and 2 above can be pruned, thereby simplifying the network structure without affecting the calculation result.

In step 205, a second operator is identified according to the amount of data change of each operator among the plurality of equivalent operators, and the second operator is combined with the target operator.

Again referring to FIG. 5, after FullyConnected (node 35) is converted to the operator Conv2D (node 44), the plurality of operators Reshape (nodes 0 and 42) and the plurality of pad operators (nodes 1, 2 and 43), it is detected that data is not increased before and after the operation of the pad operator (node 43), i.e., the amount of data before and after processing has not changed, it can be determined that the pad operator (node 43) satisfies a combination condition and is the second operator, and the pad operator (node 43) is combined with the operator Conv2D (node 44), thereby completing optimization of the neural network.

In step 206, the operators in the network layer are traversed, a transitional operator is determined according to the calculation function in the operator and data dimensions before and after processing, and the transitional operator is converted according to the type of the transitional operator.

Figure 6:
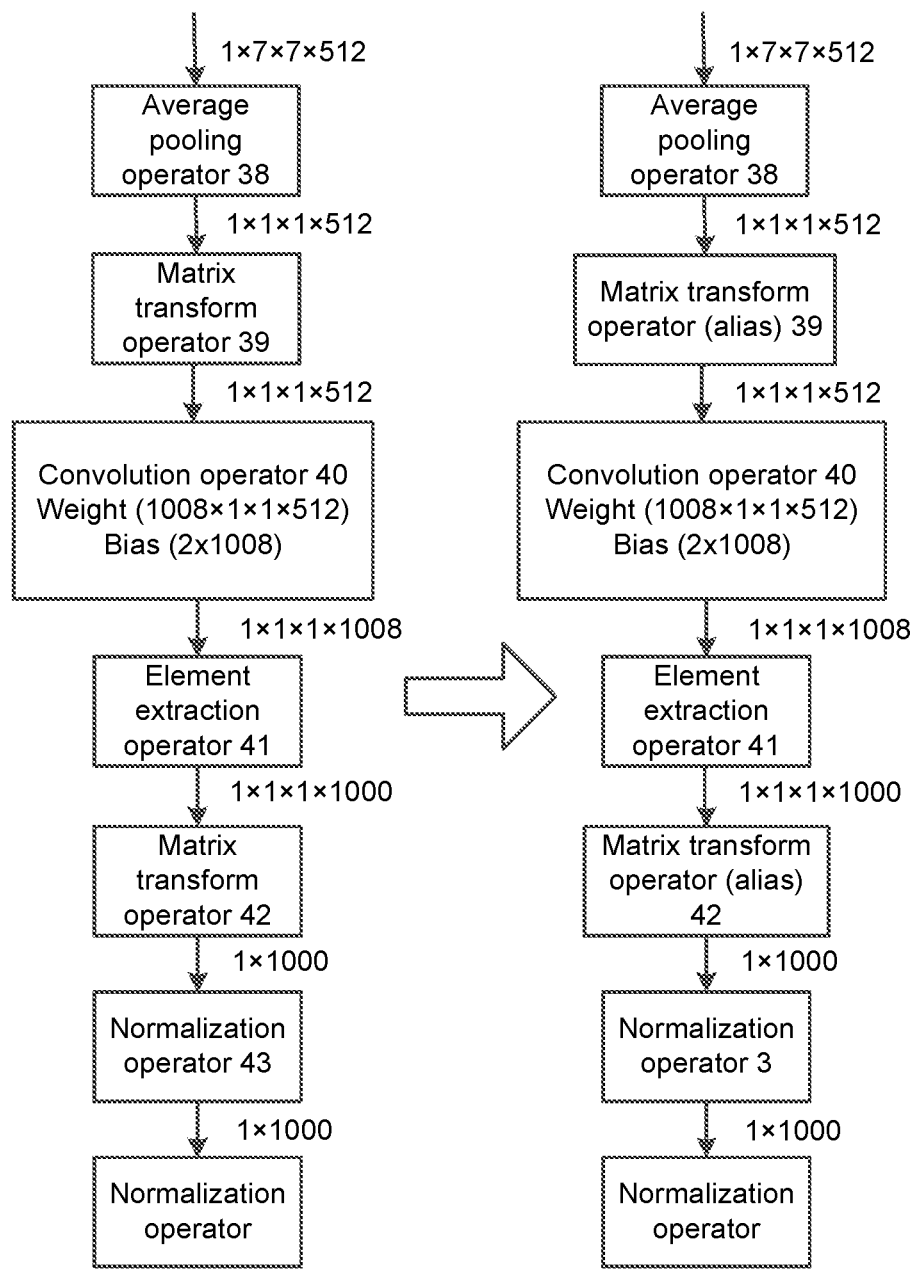

In one embodiment, referring to FIG. 6, dimension information of two operators Reshape (nodes 39 and 42) in the drawing before and after processing is kept consistent, and an arrangement order of data on a memory is not changed, and so the two operators Reshape can be converted to operators Reshape_Alias. The implementation process of the operators Reshape is not performed in the operators Reshape_Alias, and calculation of a next operator is directly proceeded. The two operators Reshape (nodes 39 and 42) above are calculation nodes in a data handling type, for a primary object of changing network data arrangement. The object of the conversion is to reduce data handling and accelerate the operation speed of the neural network.

The step of the traversing operators in the network layer, and determining a transitional operator according to the calculation function in the operator and data dimensions before and after processing may include: traversing the operators in the network layer, and selecting an operator including a predetermined calculation function; determining whether the data dimensions of the operator including the calculation function before and after processing are the same; and if the data dimensions before and after processing are the same, determining the operator including the predetermined calculation function as the transitional operator.

In step 207, the operators in the network layer are traversed, an operator incompatible with a platform operating the neural network is determined, and the incompatible operator is deleted to complete optimization of the neural network.

In one embodiment, operators in a neural network trained by such as a Tensorflow or Caffe framework can be removed, wherein functions of the operators cannot be practiced in a low power consumption hardware calculation platform and at the same time do not affect the calculation result. The primary object of removing these operators is to adapt to the low power consumption hardware calculation platform and to accelerate the adaptation of the network. For example, the operators in the network layer are traversed to determine operators incompatible with the platform operating the neural network model, and the incompatible operators are deleted, wherein the incompatible operators may be operators for which functions cannot be practiced due to the lack of certain hardware in the low power consumption calculation platform.

In one embodiment, the neural network optimized by the neural network optimization method is applied to an electronic device. More specifically, the electronic device may include a neural network calculation device, which first uses, before a calculation platform formed by a GPU, NPU, specific software and/or specific hardware operates a neural network on a neural network calculation device on the electronic device, the foregoing neural network optimization method to optimize the neural network calculation device on the electronic device, so that the optimized neural network is adapted to the neural network calculation device on the electronic device.

It is known from the above, the embodiments provided by the present invention are can quickly simplify a network structure, equivalently replace a neural network calculation and pre-calculate constant data in the neural network, wherein the equivalent replacement of the neural network calculation node does not affect the calculation result of each node, and can further combine certain nodes and delete ineffective nodes, so as to generate a network suitable for the use of a low power consumption hardware platform after optimizing the neural network. The conversion process is simple and fast, and the granularity of the neural network after the conversion is the same as that of the original neural network.

To better implement the neural network optimization method provided by the embodiments of the present invention, a device based on the foregoing neural network optimization method is further provided according to an embodiment of the present invention. Specific implementation details can be referred from the description associated with the method in the embodiments.

In one embodiment, to describe from the perspective of the neural network optimization device, the neural network optimization device can specifically be integrated in a system formed by multiple terminal devices, each of which being a terminal device having a storage unit and installed with a display screen and hence having a video playback function.

Figure 7:
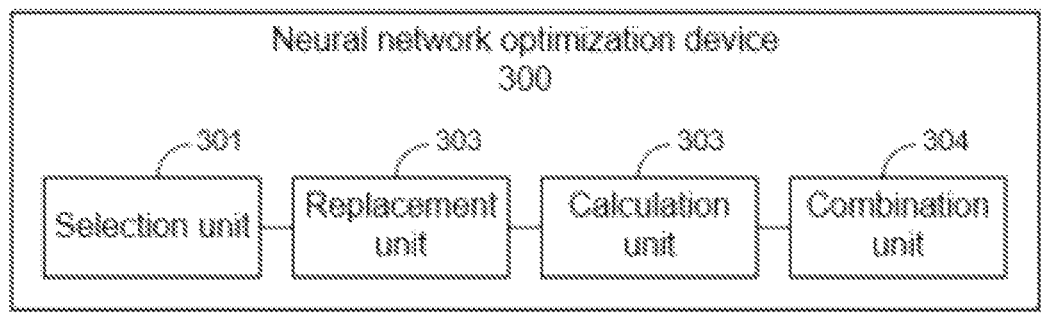
FIG. 7 is a structural schematic diagram of a neural network optimization device according to an embodiment of the present invention.

FIG. 7 shows a structural schematic diagram of a neural network optimization device 300 provided according to an embodiment of the present invention. Referring to FIG. 7, the neural network optimization device 300 includes: a selection unit 301, a replacement unit 302, a calculation unit 303 and a combination unit 304. The selection unit 301 performs the operation of step 101. The replacement unit 302 performs the operation of step 102. The calculation unit 303 performs the operation of step 103. The combination unit 304 performs the operation of step 104. In one embodiment, each the units above may complete its operation by means of executing a computer program by a central processor. In another embodiment, the units above include elements having hardware capable of executing and completing the operations. Operation details of the neural network optimization device are the same as those of the neural network optimization method described above, and specific operation details can be referred from the description on the method given in the embodiments above and are omitted herein.

Figure 8:
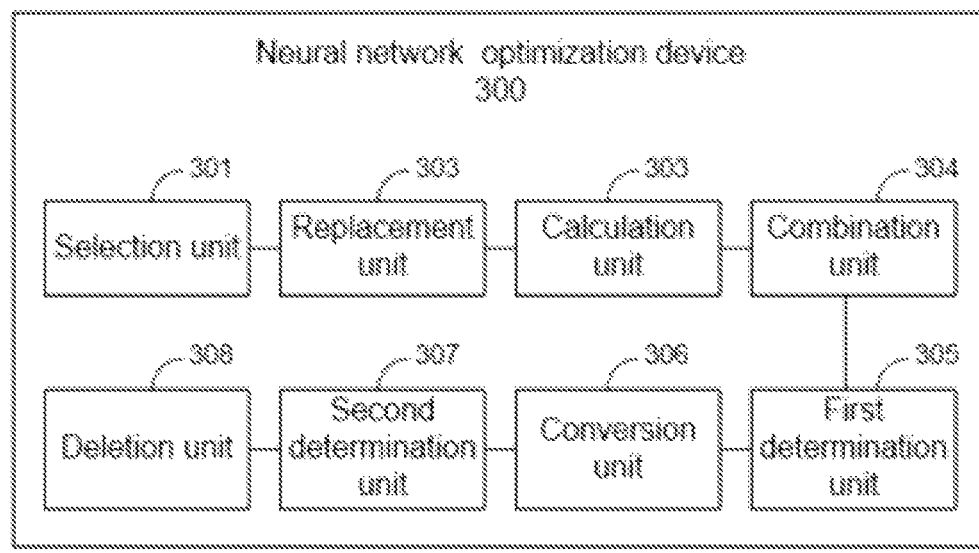
FIG. 8 is another structural schematic diagram of a neural network optimization device according to an embodiment of the present invention.

In one embodiment, referring to FIG. 8, the neural network optimization device 300 further includes a first determination unit 305, a conversion unit 306, a second determination unit 307 and a deletion unit 308. The first determination unit 305 and the conversion unit 306 perform the operation of step 206. The second determination unit 307 and the deletion unit 308 perform the operation of step 207. In one embodiment, each of the units above completes its operation by means of executing a computer program by a central processor. In another embodiment, the units are elements having hardware capable of performing and completing the operations. Operation details of the neural network optimization device are the same as those of the neural network optimization method described above, and specific implementation details can be referred from the description on the method given in the embodiments above and are omitted herein.

The neural network optimization method and device and the processor provided according to the embodiments of the present application are as described in detail above. The principle and implementation details of the present application are described by way of specific examples in the literature, and the illustrations given in the embodiments provide assistance to better understand the method and core concepts of the present application. Variations may be made to specific embodiments and application scopes by a person skilled in the art according to the concept of the present application. In conclusion, the disclosure of the detailed description is not to be construed as limitations to the present application.

What is claimed is:

1. A neural network optimization method for optimizing a neural network for operating on a device having a hardware constrained calculation platform performed by a processor, comprising:
    selecting an operator to be replaced from a plurality of operators in a network layer according to a predetermined condition;
    replacing the operator to be replaced by a plurality of equivalent operators according to a calculation function corresponding to the operator to be replaced, wherein the plurality of equivalent operators comprises a target operator;
pre-calculating for a first operator among the plurality of equivalent operators to complete a calculation function of the first operator, and inputting a calculation result into the target operator;
identifying a second operator according to data change conditions of the plurality of equivalent operators, and combining the second operator with the target operator; and
deleting the first operator,
wherein a first power needed by the processor to operate the neural network prior to applying the optimization method is greater than a second power needed by the processor to operate the neural network after applying the optimization method, and
wherein a first granularity of the neural network prior to applying the optimization method and a second granularity of the neural network after applying the optimization method are the same.

2. The neural network optimization method according to claim 1, wherein the first operator is a constant operator.

3. The neural network optimization method according to claim 1, wherein an amount of data of the second operator before and after operation does not change.

4. The neural network optimization method according to claim 1, wherein a neural network having been optimized by the neural network optimization method is applied to a calculation platform, and the predetermined condition comprises a function that is not supported by the calculation platform.

5. The neural network optimization method according to claim 1, wherein the step of replacing the operator to be replaced by the plurality of equivalent operators according to the calculation function corresponding to the operator to be replaced comprises:
calculating feature information of the target operator according to a weight and a bias of the operator to be replaced; and
replacing the operator to be replaced by the plurality of equivalent operators according to the calculation function and the feature information.

6. A processor, for executing a program code to implement a neural network optimization method for optimizing a neural network for operating on a device having a hardware constrained calculation platform, the neural network optimization method comprising:
selecting an operator to be replaced from a plurality of operators in a network layer according to a predetermined condition;
replacing the operator to be replaced by a plurality of equivalent operators according to a calculation function corresponding to the operator to be replaced, wherein the plurality of equivalent operators comprises a target operator;
pre-calculating for a first operator among the plurality of equivalent operators to complete a calculation function of the first operator, and inputting a calculation result into the target operator;
identifying a second operator according to data change conditions of the plurality of equivalent operators, and combining the second operator with the target operator; and
deleting the first operator,
wherein a first power needed by the processor to operate the neural network prior to applying the optimization method is greater than a second power needed by the processor to operate the neural network after applying the optimization method, and
wherein a first granularity of the neural network prior to applying the optimization method and a second granularity of the neural network after applying the optimization method are the same.

7. The processor according to claim 6, wherein the first operator is a constant operator.

8. The processor according to claim 6, an amount of data of the second operator before and after operation does not change.

9. An electronic device, comprising a neural network calculation device, the neural network calculation device operating a neural network model having been optimized by a neural network optimization method, the neural network optimization method for optimizing a neural network for operating on the calculation device having a hardware constrained calculation platform comprising:
selecting an operator to be replaced from a plurality of operators in a network layer according to a predetermined condition;
replacing the operator to be replaced by a plurality of equivalent operators according to a calculation function corresponding to the operator to be replaced, wherein the plurality of equivalent operators comprises a target operator;
pre-calculating for a first operator among the plurality of equivalent operators to complete a calculation function of the first operator, and inputting a calculation result into the target operator;
identifying a second operator according to data change conditions of the plurality of equivalent operators, and combining the second operator with the target operator; and
deleting the first operator,
wherein a first power needed by the device to operate the neural network prior to applying the optimization method is greater than a second power needed by the device to operate the neural network after applying the optimization method, and
wherein a first granularity of the neural network prior to applying the optimization method and a second granularity of the neural network after applying the optimization method are the same.

10. The electronic device according to claim 9, wherein the first operator is a constant operator.

11. The electronic device according to claim 9, an amount of data of the second operator before and after operation does not change.

* * * * *